June 20, 1972 E. PEKRUL 3,671,087
VARIABLE LOAD RELAY VALVE WITH BELLEVILLE SPRING TYPE LOCK FOR
EXHAUST VALVE SEAT POSITIONED ACCORDING TO LOAD
Filed Oct. 28, 1970
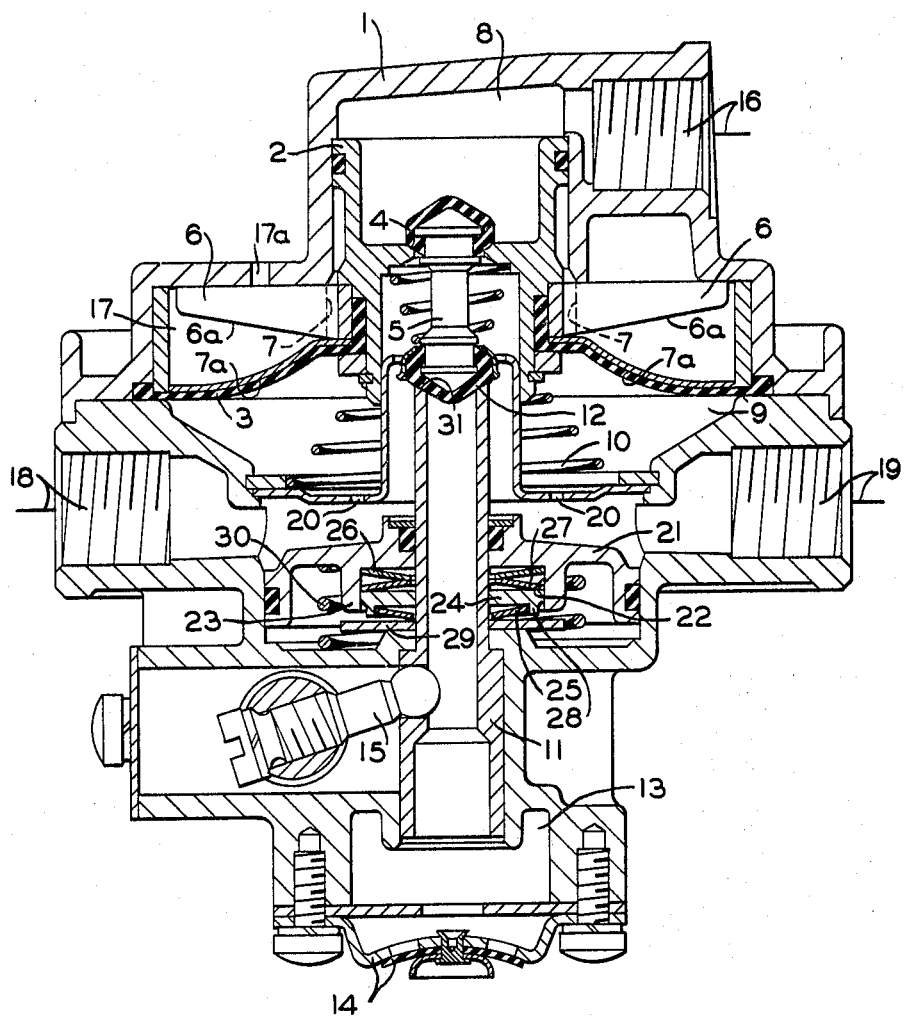
INVENTOR.
EWALD PEKRUL
BY Ralph W. McIntire, Jr.
ATTORNEY

United States Patent Office 3,671,087
Patented June 20, 1972

3,671,087
VARIABLE LOAD RELAY VALVE WITH BELLEVILLE SPRING TYPE LOCK FOR EXHAUST VALVE SEAT POSITIONED ACCORDING TO LOAD
Ewald Pekrul, Nienstedt, Germany, assignor to Westinghouse Bremsen- und Apparatebau G.m.b.H., Hannover, Germany
Filed Oct. 28, 1970, Ser. No. 84,824
Int. Cl. B60t *11/34*
U.S. Cl. 303—60                                  7 Claims

ABSTRACT OF THE DISCLOSURE

This invention relates to a fluid pressure operated Belleville spring type lock for a hollow sleeve member at one end of which is formed the exhaust valve seat of a paraboloidal type self-lapping variable load relay valve. This hollow sleeve is arranged to be held in a position to which it may be adjusted according to the load on a vehicle by the gripping action of the inner periphery of the smaller end of a Belleville spring in response to a fluid pressure force applied to the larger end by a piston subject to the delivery pressure supplied by the relay valve to one or more brake cylinders for effecting a brake application on the vehicle.

BACKGROUND OF INVENTION

A heretofore known braking power regulator operates, accordingly as the load carried by the vehicle increases the deflection of the vehicle supporting springs, to supply a correspondingly greater braking pressure to brake cylinders which are operated thereby to apply a braking force to the vehicle wheels.

Such braking power regulators are particularly suitable for trailers, where they are attached to the front axle in order to eliminate the necessity for an expensive rearrangement of the pipes. The installation of such braking power regulators at the front axle, however, is problematical insofar as the front axle is exposed to a greater extent than the rear axle to a dynamic shift of the axle load during braking. The marked pitching motions of the front axle produce a reinforced transmitted pressure and thus an adjustment of the braking power regulator, which results in a progressively increasing braking process. Steps have already been taken aimed at correcting these disadvantages. A device at one control valve, where a supporting casing that is adjusted by the transmitted pressure, is equipped with click-stop notches around its outer circumference, that mesh with correspondingly notched radially movable segments whose radial shift can be arrested by a jacket that slides over these segments, so that in case of a dynamic change of axle load the resulting increased transmitted pressure cannot push the supporting casing further in an axial direction.

But this known device is on the one hand quite complicated and expensive and on the other, it is not infinitely variable because of the notches, because for reasons of firmness, the notches cannot be reduced below a certain size.

The present invention presents a solution of the problem of providing a locking device for a braking power regulator as described above, whose construction is simple, does not require much space and assures the infinite variability of the braking power regulator.

Through the present invention this task is solved by equipping the braking power regulator with a locking element that surrounds the sleeve on which is formed an exhaust valve seat and consists of a piston on which acts the braking pressure and a Bellevile spring that clamps the sleeve and is arranged concentrically within the piston. In this construction, the piston is moved downward with simultaneous gripping of the sleeve by the Belleville spring whenever the brake cylinder is supplied with fluid under pressure, during which process the Belleville spring clamps the sleeve and prevents, even under the effect of the increased transmitted pressure that develops during braking, a further shifting of the sleeve on which the exhaust valve is formed. The locking device can be installed in a very small space and the infinitely variable shifting of the exhaust valve seat is in any case assured. The arrangement according to the invention provides a maximum of operational safety.

In an advantageous version of the invention, the piston is equipped with a recess limited by a ring-shaped rib into which is fitted a holding ring that serves to receive the Belleville spring, the holding ring being supported by a buffer spring against the fontal wall of the piston. In this way the outer periphery of the Belleville spring has an elastic bearing that assures that it is sufficiently protected against excessive stress. It is advantageous to equip the holding ring with a detent ring that supports itself on a stroke limiter plate during the stroke of the piston. Thus a limited stroke movement of the piston is achieved that is just sufficient for locking the exhaust valve sleeve.

It is advantageous if the piston can be shifted against the force exerted by a return spring. This assures a rapid unlocking of the exhaust valve sleeve.

Further details concerning the braking power regulator are explained in detail by means of an example as shown in the drawing.

This figure shows an axial section through the braking power regulator according to the invention.

In the upper part of a casing 1, a differential type abutment comprising a piston 2 and diaphragm 3 is arranged slidable and sealed. In its interior, it has an intake valve seat 4 and a double valve member 5 that is spring-loaded. Connected with the differential piston 2, 3 is a number of radial ribs 6 whose bottom surfaces 6a that face the diaphragm 3 of the differential piston 2, 3, form the parts of the cone-shaped shell. Casing 1 is provided with a number of inwardly extending stationary ribs 7 that are disposed with clearance between the ribs 6 and the spaces between ribs 7 and the bottom paraboloidal surfaces 7a of ribs 7 that face the diaphragm 3 form the parts of an opposite paraboloidal or cone-shaped shell. In the position represented in the drawing, diaphragm 3 touches these bottom surfaces 7a.

Diaphragm 3 is attached with its outer edge to casing 1, but with its inner edge to piston 2, 3. In this manner a differential piston is formed whose effective area is not variable in chamber 8, but variable in chamber 9.

This piston 2, 3 is spring biased upward by a spring 10. In a central bore provided in casing 1, a sleeve 11 is slidably mounted whose upper end has formed thereon the seat of an outlet valve 12 and whose interior is open to atmosphere via a chamber 13 and an insect excluder 14. The sleeve 11 is connected tensionally to the free end of a lever 15, which can execute angular rotations that are proportional to the load of the vehicle.

Chamber 8 is supplied via pipe and corresponding passageway 16 with compressed air coming from the brake valve. A chamber 17 is connected to the atmosphere via drilled openings 17a. Via passageways and corresponding pipes 18 and 19, the compressed air flows to the brake cylinders (not shown) and via drilled openings 20 into chamber 9 below the diaphragm 3.

Arranged in the center portion of casing 1 is a movable piston 21, sealed against casing 1 and the periphery of sleeve 11. This piston 21 is subject on its upper side, to brake cylinder pressure. In a bottomed bore 22 formed by a ring-shaped rib 23 of piston 21, a cup-shaped holding ring 24 has been placed, which rests on top of a Belleville spring 25 and which ring 24 itself supports a pair of reversely arranged Belleville springs 26 and 27 against the upper end of bottomed bore 22. The holding ring 24 also is provided with an annular boss 28 which is movable downward into contact with an annular plate 29 if piston 21 is moved downward. Piston 21 can be moved downward against the force of a spring 30.

The mode of operation of the braking power regulator according to the invention is as follows:

The compressed air fed to connection 16 from the brake valve if the brakes are applied, acts on piston 2 and moves it and diaphragm 3 of variable effective area downward against the pressure exerted by spring 10, until the double valve 5 closes the outlet valve and opens the inlet valve, so that the compressed air can flow via the openings 20 to the chamber 9 below the diaphragm 3 of variable effective area and simultaneously via passageways and pipes 18 and 19 to the brake cylinders. When piston 2 moves downward, the diaphragm 3 is lifted off the paraboloidal bottom surfaces 7a of ribs 7 by the bottom surfaces 6a of ribs 6, so that the effective area of diaphragm 3 subject to fluid under pressure in chamber 9 is increased. In chamber 9 an air pressure develops whose intensity is related to that in chamber 8 in the same manner as the effective area of piston 2 is related to the momentary effective area of diaphragm 3. The ratio between these active surfaces is influenced by the position of the annular exhaust valve seat 31 of the exhaust valve 12 which seat 31 is formed on the upper end of sleeve 11. The smaller the load on the axles of the vehicle, the further lever 15 is turned clockwise and in this way it determines the position of the exhaust valve seat 31 of exhaust valve 12 and, consequently, the position of the differential piston diaphragm 2, 3, which automatically determines the effective area of diaphragm 3 in proportional dependence of the load of the vehicle.

In order to prevent a further shifting of the sleeve 11 during braking as it would be caused by the dynamic shifting of the axle load and the subsequent increased pitching movement of the front axle, the locking device whose structure has already been described, becomes active. Simultaneously with the supply of fluid under pressure to the brake cylinders, piston 21 of the locking device becomes subject to the brake cylinder pressure and is moved downward against the force exerted by spring 30, to the point where the annular boss 28 of the holding ring 24 abuts the stop 29. The consequence of this shifting of the piston 21 is that the Belleville spring 25 which is disposed about the sleeve 11 is deflected downward so that its inner or interior diameter at its lower end becomes somewhat smaller in the clamping position than the diameter of the sleeve 11 so that it grips sleeve 11 and prevents a further movement of the sleeve 11 in the direction of the full load adjustment by this clamping against the periphery of sleeve 11 and thus eliminates the undesirable buildup in the brake cylinders of a braking pressure that would be greater than that corresponding to that required for the actual axle load. The Belleville springs 26 and 27, arranged between the holding ring 24 and the upper end of bottomed bore 22 in piston 21, provides an effective protection of the locking device against overloading.

When the brake valve is released, chamber 8 is emptied and piston 2 and diaphragm 3 are pressed upward by spring 10, which closes the inlet valve and opens the exhaust valve. In this way, piston 21 is likewise freed from the braking pressure and the locking of the sleeve 11 is cancelled through the restoring force of spring 30.

Having now described the invention what I claim as new and desire to secure by Letters Patent is:

1. For use in a vehicle fluid pressure brake apparatus, a relay valve for controlling the degree of fluid pressure supplied to effect a brake application, said relay valve comprising:
   (a) a casing having a bore,
   (b) a sleeve having an annular exhaust valve seat formed on one end thereof and movably mounted in said bore,
   (c) a double valve member including a supply and an exhaust valve disposed in coaxial spaced-apart relationship one with the other, and movable by and also relative to said sleeve,
   (d) resilient means normally urging said valves toward a closed position,
   (e) two opposed fluid pressure responsive movable abutments for controlling operation of said supply and exhaust valves with respect to said sleeve, one of said abutments being of a variable effective area and arranged to be subjected to a selected fluid pressure established according to a desired degree of brake applying pressure, the other of said abutments being of constant effective area and subject to a braking control pressure,
   (f) paraboloidal surface means on said casing cooperating with said one abutment in such manner that the effective area of said one abutment is varied according to the axial position of said sleeve and exhaust valve seat thereon in said bore,
wherein the improvement comprises:
   (g) locking means for said sleeve including:
      (i) a Belleville spring means disposed in surrounding relation to said sleeve, and
      (ii) fluid pressure controlled means for operating said Belleville spring means into locking engagement with said sleeve.

2. For use in a vehicle fluid pressure brake apparatus, a valve device as recited in claim 1, further characterized in that said locking means for said sleeve further includes stop means for limiting movement of said fluid pressure controlled means.

3. For use in a vehicle fluid pressure brake apparatus, a valve device as recited in claim 1, further characterized in that said fluid pressure controlled means of said locking means for said sleeve comprises:
   (a) a piston having a bore through which said sleeve extends and a coaxial counterbore extending inward from one face thereof, and that said Belleville spring means is disposed in said counterbore and includes a plurality of Belleville springs disposed in surrounding relation to said sleeve and a cup-shaped holding ring interposed between a pair of said Belleville springs for receiving therein the larger end of one of said pair of Belleville springs, the smaller end of said one Belleville spring being movable into locking engagement with said sleeve in response to the supply of fluid under pressure to the other face of said piston.

4. For use in a vehicle fluid pressure brake apparatus, a valve device as recited in claim 3, further characterized by resilient biasing means interposed between said casing and said piston for yieldingly resisting movement of said piston in the direction in which said one of said pair of Belleville springs is moved into locking engagement with said sleeve.

5. For use in a vehicle fluid pressure brake apparatus, a valve device as recited in claim 3, further characterized in that the other of said pair of Belleville springs, and another of said plurality of Belleville springs are oppositely arranged in surrounding relation to said sleeve and interposed between said holding ring and the inner end of said counterbore in said piston for resiliently supporting said holding ring within said counterbore in said piston.

6. For use in a vehicle fluid pressure brake apparatus, a valve device as recited in claim 3, further characterized by a stop, and in that said cup-shaped holding ring is movable into abutting relationship with said stop to limit deflection of said one of said pair of Belleville springs into gripping relationship with the peripheral surface of said sleeve.

7. For use in a vehicle fluid pressure brake apparatus, a valve device as recited in claim 6, further characterized in that said stop comprises an annular plate disposed in surrounding relation to said sleeve, said annular plate being supported on said casing and supporting thereon the smaller end of said one of said pair of Belleville springs.

References Cited

UNITED STATES PATENTS

| 2,450,464 | 10/1948 | Bent | 303—22 R |
| 3,228,731 | 1/1966 | Valentine | 303—60 |
| 3,302,982 | 2/1967 | Pekrul | 303—60 |

DUANE A. REGER, Primary Examiner

U.S. Cl. X.R.

303—22, 54, 89